United States Patent
Arora et al.

(10) Patent No.: US 11,366,488 B1
(45) Date of Patent: Jun. 21, 2022

(54) TIMER FOR USE IN AN ASYMMETRIC MUTLI-CORE SYSTEM

(71) Applicant: NXP USA, Inc., Austin, TX (US)

(72) Inventors: Mohit Arora, Austin, TX (US); Tuongvu Van Nguyen, Austin, TX (US); Milton Hissasi Kataoka, Sao Paulo (BR); Rob Cosaro, San Jose, CA (US); Shenwei Wang, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/303,096

(22) Filed: May 20, 2021

(51) Int. Cl.
| | |
|---|---|
| *G06F 1/12* | (2006.01) |
| *G06F 9/44* | (2018.01) |
| *G06F 1/3287* | (2019.01) |
| *G06F 9/4401* | (2018.01) |

(52) U.S. Cl.
CPC .............. *G06F 1/12* (2013.01); *G06F 1/3287* (2013.01); *G06F 9/4418* (2013.01)

(58) Field of Classification Search
CPC ......... G06F 1/12; G06F 1/3287; G06F 9/4418
See application file for complete search history.

(56) References Cited

U.S. PATENT DOCUMENTS

| | | | |
|---|---|---|---|
| 5,634,045 A | 5/1997 | Goler et al. | |
| 5,729,721 A | 3/1998 | Bettelheim et al. | |
| 5,812,833 A | 9/1998 | Goler et al. | |
| 6,219,564 B1 | 4/2001 | Grayson et al. | |
| 7,058,838 B2 | 6/2006 | Xu | |
| 7,602,874 B2 | 10/2009 | Hilgendorf et al. | |
| 7,886,177 B2 | 2/2011 | Bennett et al. | |
| 8,190,942 B2 | 5/2012 | Simon et al. | |
| 8,713,348 B2 | 4/2014 | Chen et al. | |
| 9,483,325 B2* | 11/2016 | Laborde | G06F 9/52 |
| 9,864,399 B2 | 1/2018 | Yu et al. | |
| 2009/0082635 A1* | 3/2009 | Baldus | G16H 10/20 709/224 |
| 2012/0054513 A1 | 3/2012 | Chen et al. | |
| 2014/0215198 A1 | 7/2014 | Bhargava | |
| 2017/0060175 A1* | 3/2017 | Waugh | G06F 1/26 |
| 2020/0133330 A1* | 4/2020 | Bordogna | G06F 1/14 |

* cited by examiner

*Primary Examiner* — Stefan Stoynov (57) ABSTRACT

An integrated circuit includes a first processing domain configured to run a first operating system and a second processing domain configured to run a second operating system that is different than the first operating system. The integrated circuit further includes a time stamp timer circuit in the first processing domain configured to provide a first time stamp value to the first processing domain and an adjusted second time stamp value to the second processing domain. The time stamp timer circuit includes a timer adjust circuit configured to synchronize the adjusted second time stamp value when a power up signal is received by the time stamp timer circuit from the second processing domain.

20 Claims, 4 Drawing Sheets

TIMER FOR USE IN AN ASYMMETRIC MUTLI-CORE SYSTEM

BACKGROUND

Field

This disclosure relates generally to timing circuits, and more specifically, to a timer for use in an asymmetric multi-core system.

Related Art

In a single core system, the software architecture typically uses an on-chip system timer as an Operating System (OS) Tick for the operating system. However, for a multiple core (i.e. multi-core) asymmetric that includes more than one different OS (such as, for example, a core running a Linux operating system and a core running a real time OS (RTOS)), independent decoupled timers can be used, but this is not desirable as it would not offer a common time base between the OSes. Therefore, a need exists for an improved timing system within an asymmetric multi-core system.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

An asymmetric multi-core system is a system which includes at least two core domains which operate according to at least two different operating systems. Each of the core domains can include one or more cores. In one embodiment, a first core domain (also referred to as a primary core domain or primary domain) includes a time stamp timer (TS Timer) which is utilized as a base for the remaining core domains of the at least two core domains. In this manner, the TS Timer of the primary domain provides a unified OS timer for the asymmetric multi-core system. For each of the remaining core domains of the at least two core domains, the primary domain includes a corresponding timer adjust circuit which adjusts the current value of the TS Timer and provides the adjusted TS Timer value for use as the OS timer in the corresponding receiving domain. In this manner, the timer adjust circuits allow the primary domain to provide a unified OS timer as a base for the other domains without requiring software programming of any registers, which reduces the possibility of any of the domains being able to override the timing settings in the primary domain.

Figure 1:
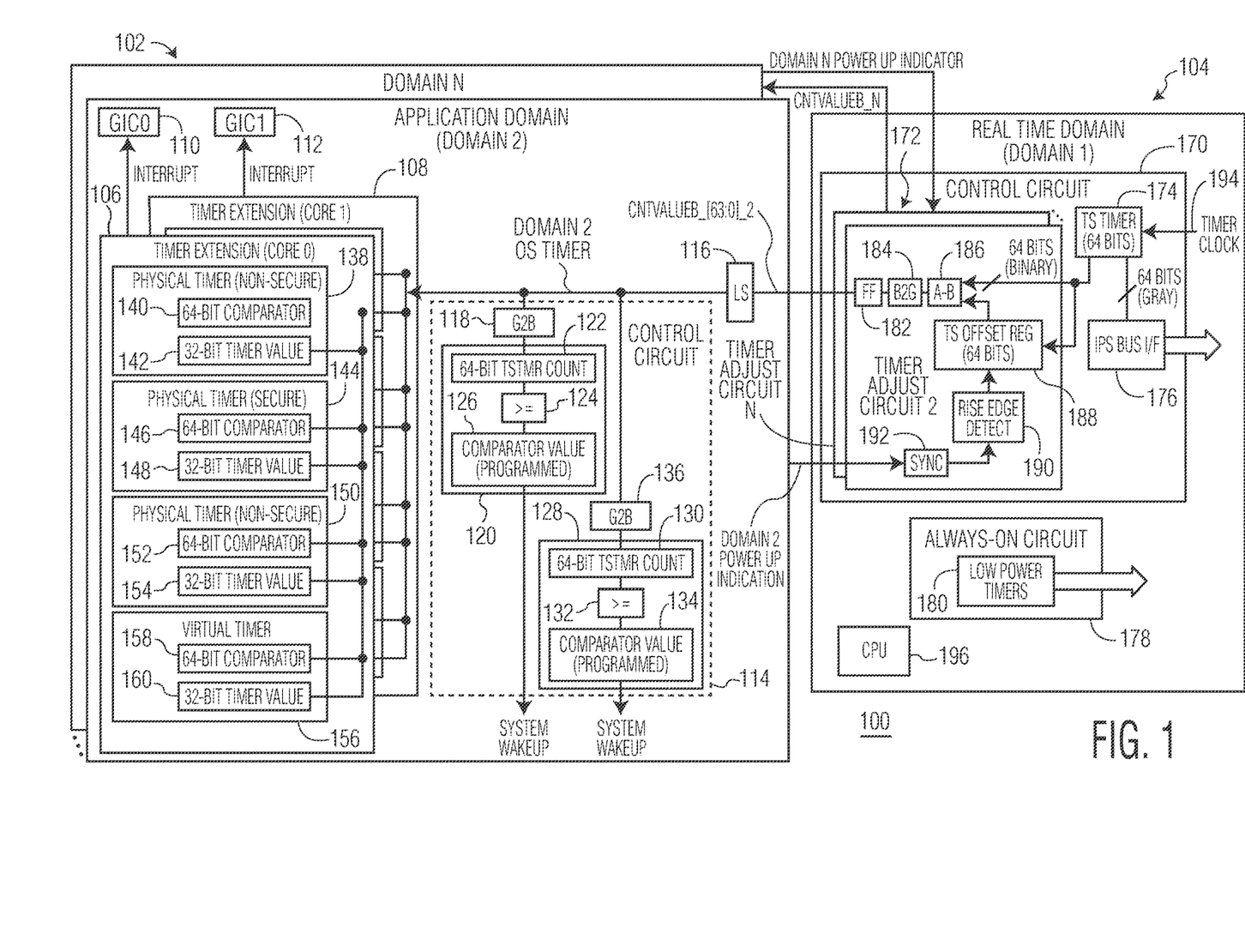
FIG. 1 illustrates, in block diagram form, an asymmetric multi-core system in accordance with one embodiment of the present invention.

FIG. 1 illustrates an asymmetric multi-core system 100 having N core domains, which are referred to as Domain 1 through Domain N, and each core domain may include one or more cores. An asymmetric system is a heterogenous system which includes at least two different operating systems. For example, one domain (such as Domain 1) may correspond to a real time domain operating using a real time operating system (RTOS) while another domain (such as Domain 2) may be an application domain using a different OS, such as an Android™ or Linux™ based OS (in which Android™ is a trademark of Google LLC and Linux™ is a trademark of Linus Torvalds). In the illustrated embodiment, Domain 1 104 is a primary domain which includes a universal timer 174, and Domains 102(2-N) are secondary domains which utilize the universal timer of the primary domain as a base to generate a corresponding OS timer in each of the secondary domains. Note that a core domain may also be referred to as a processing domain. In one embodiment, system 100 is located on a single integrated circuit and may therefore be referred to as a System on a Chip (SoC).

In the illustrated embodiment, primary domain 104 (which may simply be referred to herein as "domain 1") is a real time domain operating using an RTOS, and includes a control circuit 170 (which may also be referred to as a timer stamp timer circuit), an always-on circuit 178, and a central processing unit (CPU) 196 (which may also be referred to as a core of domain 1). Always-on circuit 178 includes low power timers 180. Control circuit 170 includes a bus interface 176 capable of being accessed by software executing on CPU 196 and a timestamp timer (TS Timer) 174 coupled to bus interface 176 which operates as the universal timer for system 100. TS Timer 174 receives a fixed frequency timer clock 194, which, in one embodiment, is a one megahertz (MHz) clock generated by an internal RC oscillator (IRC), or alternatively, may be produced by a more accurate, external crystal oscillator. Therefore, during normal operation, TS Timer 174 increments by one with each rising edge of clock 194. (Alternatively, it may increment by one with each falling edge of clock 194.) In the illustrated embodiment, TS timer 174 is a 64-bit timer and is provided to each timer adjust circuit 172.

Each timer adjust circuit 172 corresponds to one of domains 102(2-N). For example, timer adjust circuit 172(2) corresponds to domain 102(2), and provides a 64-bit CNTVALUEB[63:0]_2 to domain 102(2), and receives a domain 2 power up indicator from domain 102(2). The domain 2 power up indicator (also referred to as a power up signal) indicates to domain 104 when a power up of domain 102(2) occurs. Timer adjust circuit 172(2) includes a synchronization circuit 192, a rise edge detect circuit 190, a TS offset register 188 (which is at least the same bit-width as TS timer 174, which is 64 bits in this example), a subtractor circuit 186, a binary to gray code converter circuit 184, and flip flops 182 for storing the bits of CNTVALUEB_2 provided at the output of primary domain 104. TS timer 174 is provided as inputs to subtractor circuit 186 and TS offset register 188. Each of the timer adjust circuits 172 includes the same circuitry such that each timer adjust circuit provides a corresponding 64-bit CNTVALUB and receives a corresponding domain power up indicator. For example, timer adjust circuit 172(N) provides CNTVALUB_N to domain 102(N), and receives a domain N power up indicator from domain 102(N). TS timer 174 is provided as inputs to the subtractor circuit and TS offset register of timer adjust circuit 172(N).

Referring to timer adjust circuit 172(2) as an example, sync 192 provides level shifting and synchronization, as needed, of the received domain 2 power up indicator so as to convert the indicator from a signal provided by domain 102(2) to a signal useable by domain 104. For example, it may be implemented as a standard synchronizer which provides synchronization between different clock domains. The resulting synchronized domain 2 power up indicator is provided to rise edge detect circuit 190 which detects a next rising edge of the indicator. Note that, in the current embodiment, the rising edge of the domain 2 power up indicator occurs in response to the powering up of domain 102(2). Upon detection of the rising edge, TS Offset Register 188 captures and stores the current value of TS Timer 174. The value stored in TS Offset Register 188, along with the output of TS Timer 174, is provided to subtractor 186. On each timer tick of TS Timer 174, subtractor 186 subtracts the binary value stored in TS Offset Register 188 from the current binary value of TS Timer 174. The resulting difference (referred to as the adjusted count value) is provided to binary to gray code converter 184 which converts the 64-bit binary value to a 64-bit gray code value, as known in the art, for improved reliability. The resulting 64-bit gray code value is provided for storage into flip flops 182, which outputs the stored 64-bit gray code value as CNTVALUEB[63:0]_2 to domain 102(2).

Note that in alternate embodiments, binary to grey code converter 184 may not be present such that the binary value is directly provided to flip flops 182. Alternatively, other encodings may be used to transfer the adjusted count value between domains. Also, note that any storage circuitry may be used in for register 188, and any type of storage, such as first-in first-out queues (FIFOs) can be used, as needed, in addition to or in place of flip flops 182 to properly transfer the values out from domain 104. Also, rise edge detect 190 may instead be a falling edge detector. All these alternatives apply to each timer adjust circuit 172. Furthermore, additional circuitry may be present in each timer adjust circuit 172, as needed, to properly receive the corresponding power up indicator, properly determine the adjusted count value using the captured timer value at the most recent power up, and properly provide the adjusted count value to a corresponding secondary domain. Also, while a 64-bit timer and 64-bit count values are being used in the embodiment of FIG. 1, any size timer and count values may be used, such as a 128-bit timer which provides 128-bit count values and 128-bit adjusted count values.

Domains 102(2-N) are secondary domains and are each coupled to a corresponding timer adjust circuit of domain 104. Domain 102(2) will be described as an example secondary domain. A secondary domain is a domain which uses the universal timer of the primary domain (e.g. TS Timer 174 of domain 104) as the base for its own OS timer. In the illustrated embodiment, domain 102(2) (which may also simply be referred to herein as "domain 2") includes a level shifter 116 which receives the 64-bit CNTVALUEB[63:0]_2 from timer adjust circuit 172(2), and level shifts the signal, as needed, to operate within domain 2. The level shifted signal provides the domain 2 OS timer. Therefore, the domain 2 OS timer is based on TS timer 174, which is adjusted by timer adjust circuit 172(2) and processed, as needed (e.g. level shifted, encoded, stored, etc.) for domain 2.

In the illustrated embodiment, domain 2 is a dual core application domain utilizing a Linux™ based OS on each of core 0 and core 1, in which each core can be any type of core. In one embodiment, each of the cores is an Arm™-based core (Arm is a trademark of Arm Limited). Alternatively, domain 2 can include any number of cores. Domain 2 includes a control circuit 114, and each of the cores includes a timer extension (e.g. 106, 108) which includes a set of timers, each timer including a 64-bit comparator as well as a 32-bit timer value. Each timer extension can also provide interrupts to a corresponding interrupt controller (e.g. 110, 112). For example, timer extension 106 includes a non-secure physical timer 138 (which includes a comparator 140 and a timer value 142), a secure physical timer 144 (which includes a comparator 146 and a timer value 148), a second non-secure physical timer 150 (which includes a comparator 152 and timer value 154), and a virtual timer 156 (which includes a comparator 158 and timer value 160), and provides interrupts to a corresponding interrupt register 110. This set of timers can be used by the OS as needed to generate interrupts or perform other functions based on the domain 2 OS timer. Each of the timers receives the domain 2 OS timer and thus operates based on the universal timer in domain 1. (Note that at the input of each timer extension, domain 2 may include gray code to binary converters such that the binary values are used by the timer extensions.)

Control circuit 114 includes grey code to binary converters 118 and 136. The output of converter 118 is provided to a wakeup circuit 120 which stores the adjusted 64-bit TS Timer (TSTMR) count value in storage 122 and includes comparator circuitry 124 and a programmed comparator value 126. The output of converter 126 is provided to a wakeup circuit 128 which stores the adjusted 64-bit TSTMR count value in storage 130 and includes comparator circuitry 132 and a programmed comparator value. Therefore, the adjusted 64-bit TSTMR count values stored in 122 or 130 correspond to the count values of domain 2 OS timer, and each of storage 122 and 130 can be implemented as registers. Control circuit 114 includes wakeup circuits configured to schedule wakeup events. For example, wakeup circuit 120 asserts a system wakeup when comparator circuit 124 indicates that the adjusted 64-bit TSTMR count value of storage 122 has reached comparator value 126, and wakeup circuit 128 asserts a system wakeup when comparator circuit 132 indicates that the 64-bit TSTMR count value of storage 130 has reached comparator value 134. The wakeup circuits in control circuit 114 are useful in the case, for example, when domain 2 is in a low power mode in which clocks to the cores are gated, and thus the timer extensions cannot be used. With wakeup circuits 120 and 128, which are external to the cores, a system wakeup can still be performed in response to TS Timer 174 (i.e. in response to domain 2 OS timer), even during low power mode.

In operation, upon power up of domain 2 (such as after reset), the operating system of domain 2 needs to start its OS timer at zero. However, in the situation in which domain 2 uses the timer of domain 1 as a basis for its OS timer, upon powering down, TS timer 174 of domain 1 continues to count. Therefore when domain 2 powers up again, TS timer 174 is at a greater number than when domain 2 powered down. By capturing (storing) the value of TS timer 174 in TS offset register 188 upon domain 2 powering back up, the correct value can be provided as the OS timer of domain 2 based on TS timer 174. Once domain 2 has powered up, the captured value in TS offset register 188 is provided to subtractor 186 which is used to provide the proper count value to domain 2. As described above, with each tick of TS timer 174, the static value stored in offset register 188 is subtracted from the value of TS timer 174 to provide the proper count value to domain 2 on a per-count basis of TS timer 174.

As an example, if TS timer 174 is at decimal count value 100 when domain 2 is powered down and is at decimal count value 150 when domain 2 powers up again, then the binary version of 150 is captured in TS offset register 188. With each tick of TS timer 174 upon power up of domain 2 (e.g. count values 150, 151, 152, etc.), the value of 150 is subtracted such that the count value provided to domain 2 is 0 ("150–150"), 1 ("151–150"), 2 ("152–150"), etc. In this manner, up power up of domain 2, the domain 2 OS timer starts with zero, as expected. This is the case for each of domains 102 (2-N) because each domain has its corresponding timer adjust circuit 172 to ensure that, upon power up, the corresponding domain starts correctly with zero. Timer adjust circuit 172 can be fully implemented in hardware without requiring software control.

Figure 2:
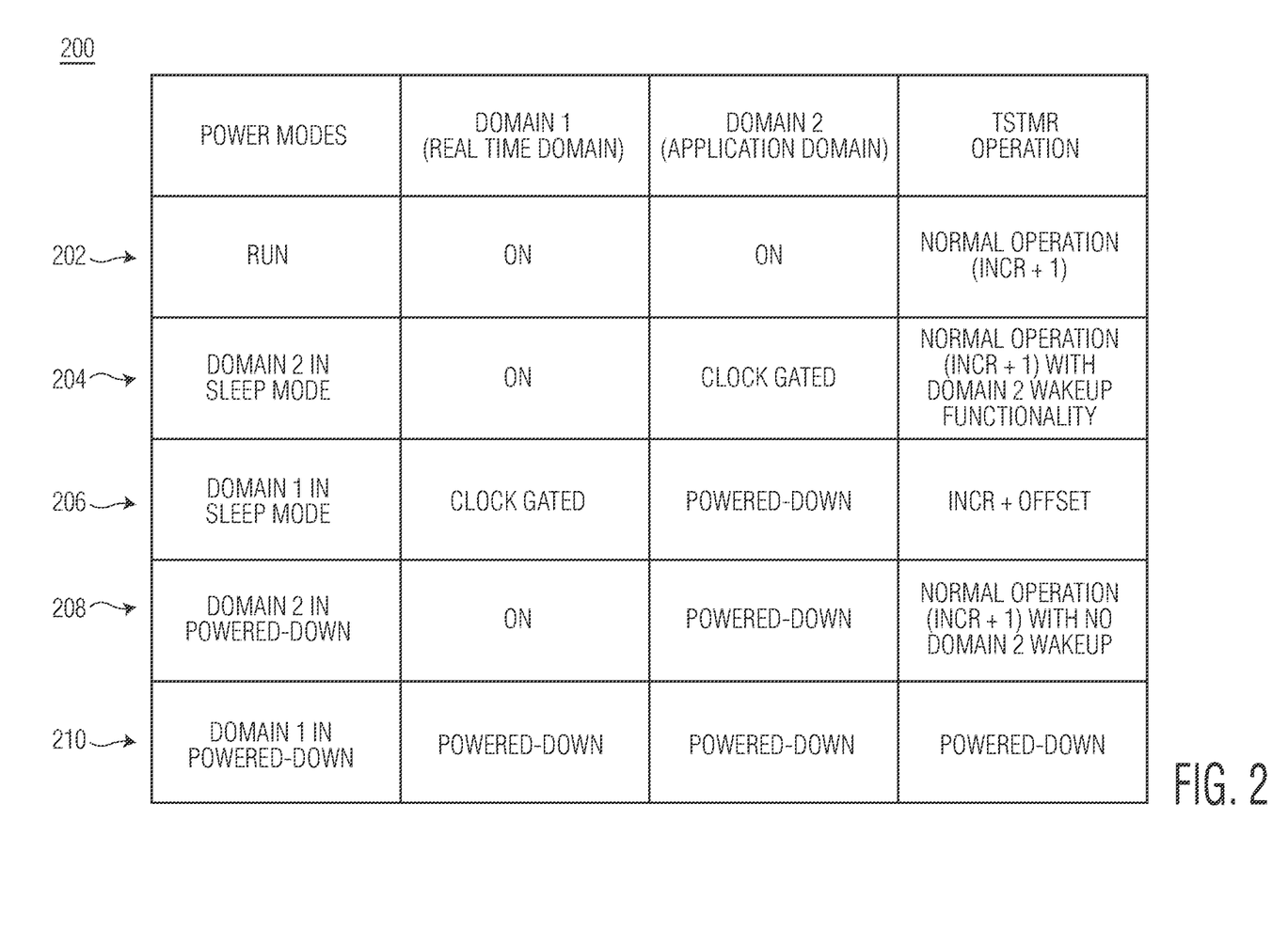
FIG. 2 illustrates a table of various power modes within the asymmetric multi-core system of FIG. 1, in accordance with one embodiment of the present invention.

FIG. 2 illustrates a table 200 which provides example various power modes for domains 1 and 2 of system 100 and along with operation of TS timer 174 of domain 1 in each power mode. Row 202 of table 200 corresponds to a Run power mode in which both domain 1 and domain 2 are on. TS timer 174 is in normal operation (incrementing by one, i.e. INCR+1, with each cycle of timer clock 194). Row 204 corresponds to domain 2 being in sleep mode (a low power mode) in which domain 1 is on but domain 2 is clock gated. TS timer 174 is in normal operation (incrementing by one, i.e. INCR+1, each cycle of timer clock 194). Timer extensions 106 and 108 are not useable since they are clock gated, but domain 2 still retains wakeup functionality using control circuit 114 which is not clock gated and can generate system wakeup signals based on the value of the domain 2 OS timer (which is based on TS Timer 174). Row 208 corresponds to domain 2 being powered-down in which domain 1 is on. In this case, TS timer 174 continues in normal operation (incrementing by one, i.e. INCR+1, each cycle of timer clock 194), but since domain 2 is powered down, it has no wakeup capabilities using TS timer 174. Row 210 corresponds to both domain 1 and domain 2 being powered-down. Therefore, TS timer 174 is also powered down.

Row 206 corresponds to domain 1 being in sleep mode (a low power mode) and domain 2 being powered down. Since domain 1 is in a low power mode, TS timer 174 operates in accordance with a low power mode. In this low power mode, TS timer 174 is incremented by an OFFSET value rather than by one with each cycle of timer clock 194. Also, during this low power mode, timer clock 194 is provided as a slower clock.

Figure 3:
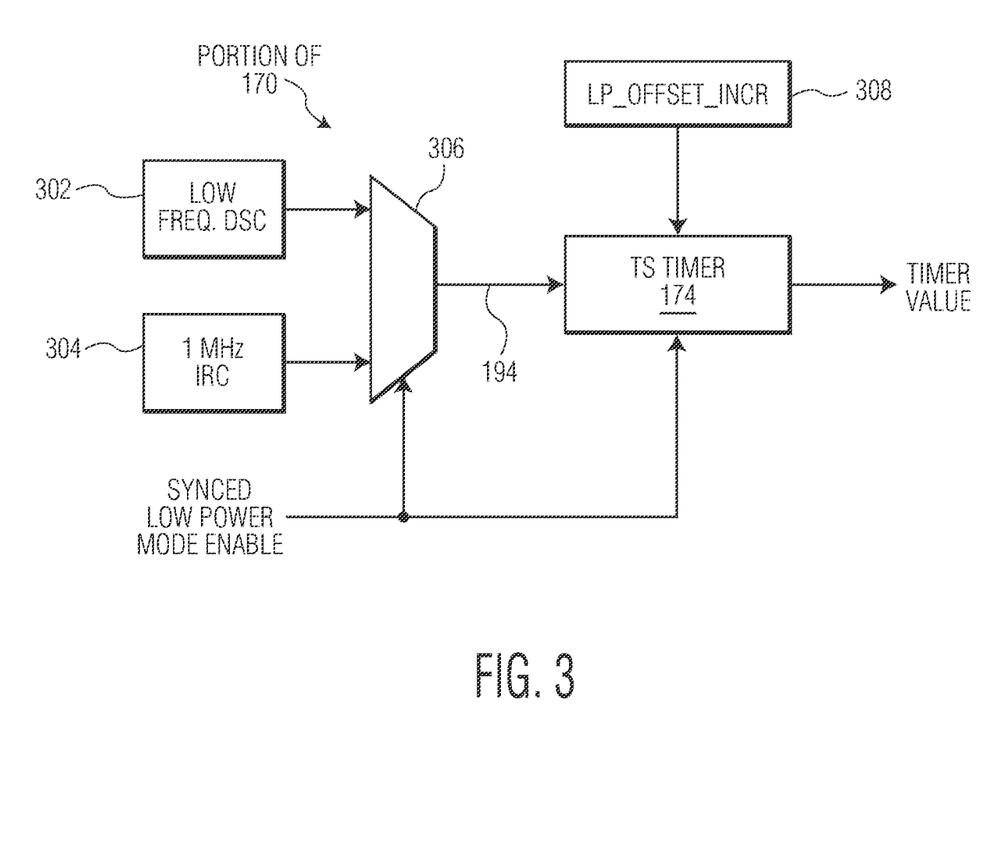
FIG. 3 illustrates a portion of a control circuit of FIG. 1, in accordance with one embodiment of the present invention.

FIG. 3 illustrates, in block diagram form, one embodiment of control circuit 170 for implementing the low power operation of row 206 of FIG. 2. In the embodiment of FIG. 3, timer clock 194 is provided at an output of a multiplexer (MUX) 306 which receives a low frequency oscillator output 302 (also referred to as a low frequency clock 302) at a first input and a fixed frequency 1 MHz IRC 304 (also referred to as clock 304) at a second input. A synced low power mode enable signal is provided to a control input of MUX 306, such that during normal mode (when synced low power mode enable is negated), MUX 306 selects clock 304 to provide as timer clock 194 to TS timer 174, but during low power mode (when synced low power mode enable is asserted), MUX 306 selects low frequency clock 302 to provide as timer clock 194. In one embodiment, low frequency clock 302 has a much lower frequency than clock 304, such as, for example, 32 kHz. In alternate embodiments, clock 304 for use during normal operation may have a different frequency, and lower frequency clock 302 may have any lower frequency.

The synced low power mode enable signal is also provided to TS timer 174 such that, when the synced low power mode enable signal is negated, TS timer 174 increments normally (e.g. by one) with each cycle of TS timer 194 (corresponding to clock 304). However, when the synced low power mode enable signal is asserted, TS timer 174 increments by a predetermined OFFSET value (stored in LP_offset_INCR 308) with each cycle of TS Timer 194 (corresponding to clock 302). Therefore, as reflected in row 206 of FIG. 2, when domain 1 is in sleep mode (a low power mode), TS timer 174 increments by OFFSET (and timer clock 194 is provided by the slower low power clock).

Figure 4:
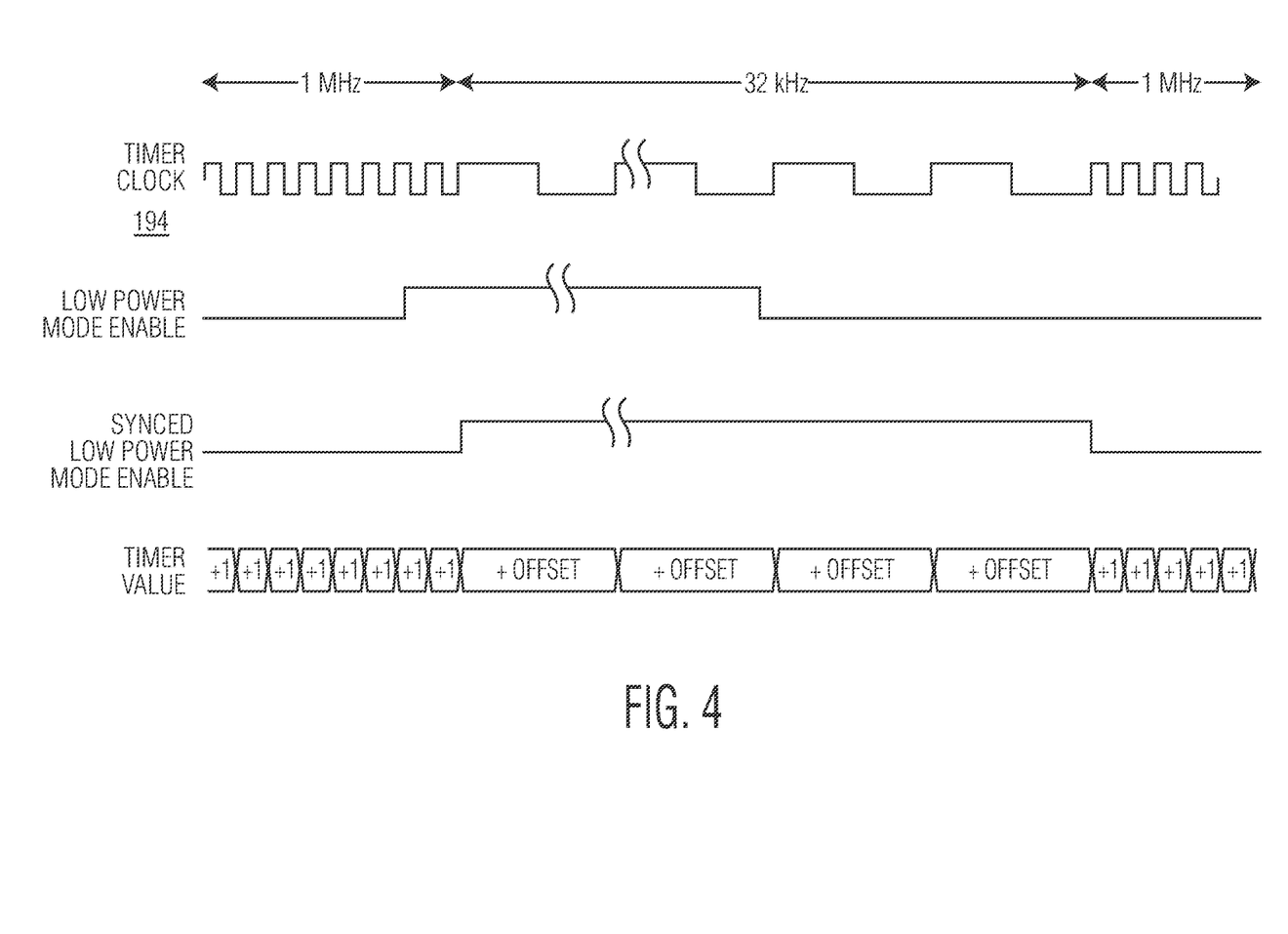
FIG. 4 illustrates a timing diagram of various signals used within the portion of the control circuit of FIG. 3, in accordance with one embodiment of the present invention.

FIG. 4 illustrates a timing diagram of various signals of FIG. 3 in accordance with one embodiment which assumes clock 304 (for normal operation) is 1 MHz and clock 302 (for low power operation) is 32 kHz. With low power mode enable signal negated, with each cycle of timer clock 194 (which corresponds to the 1 MHz clock), the value of TS timer 174 increments by one. The synced low power mode enable signal is a synced version of a low power enable signal. That is, the low power mode enable signal is delayed by a certain number of clocks (due to the addition of a synchronizer) to produce synced low power enable signal. When low power mode enable signal asserted, the synced low power enable signal is also asserted (a few clock cycles later). With synced low power enable signal asserted, with each cycle of timer clock 194 (which now corresponds to the 32 kHz clock), the value of TS timer 174 increments by OFFSET. In the illustrated embodiment, TS timer 174 counts (e.g. increments) with each rising edge of timer clock 194, but in alternate embodiments, may instead count or increment with each falling edge of timer clock 194.

Therefore, by now it can be appreciated how an asymmetric (i.e. heterogenous) multi-core system is capable of having one or more secondary domains share a primary domain's OS timer. Each of the one or more secondary domains receives a corresponding count value based on the primary domain's OS timer which is used to generate each one or more secondary domain's OS timer. For example, upon powering up a secondary domain, the value of the primary domain's OS timer is captured and stored such that it can be used to adjust the value of the primary domain's OS timer on a per-count basis. The adjusted value is used by the powered up secondary domain to appropriately provide the OS timer for the powered up secondary domain.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

In one embodiment, the illustrated elements of system 100 are circuitry located on a single integrated circuit or within a same device. Alternatively, system 100 may additional elements located on any number of separate integrated circuits or separate devices interconnected with each other. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, any type and number of cores can be included in any of the domains of system 100. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, an integrated circuit includes a first processing domain configured to run a first operating system; a second processing domain configured to run a second operating system that is different than the first operating system; and a time stamp timer circuit in the first processing domain configured to provide a first time stamp value to the first processing domain and an adjusted second time stamp value to the second processing domain, wherein the time stamp timer circuit includes a timer adjust circuit configured to synchronize the adjusted second time stamp value when a power up signal is received by the time stamp timer circuit from the second processing domain. In one aspect, the timer adjust circuit is configured to store the first time stamp value when the power up signal is received from the second processing domain, and subtract the stored first time stamp value from the first time stamp value to generate the adjusted second time stamp value that is provided to the second processing domain. In another aspect, the power up indication is sent by the second processing domain when the second processing domain wakes up from a power saving mode. In another aspect, the timer adjust circuit further includes a binary to Gray code circuit to convert the adjusted second time stamp value to a Gray code format. In yet another aspect, the timer adjust circuit synchronizes the adjusted second time stamp value upon detecting a rising edge of the power up signal. In another aspect, the integrated circuit further includes a control circuit in the second processing domain configured to schedule wake-up events by comparing the adjusted second time stamp value to a predetermined value that must be reached to signal a wake-up event. In another aspect, the first and second processing domains are implemented in a system-on-a-chip. In a further aspect, the first operating system is a real-time operating system and the second operating system is an application operating system. In another aspect, the first time stamp value is incremented based on a first clock signal and the adjusted second time stamp value is generated by subtracting the stored first time stamp value from the first time stamp value each time the first time stamp value is incremented. In a further aspect, when the first processing domain is in a low power mode and the second processing domain is powered down, the first time stamp value is incremented based on a second clock signal with a frequency that is lower than the first clock signal. In yet another aspect, the first time stamp value is incremented by an offset value when a synced low power mode enable signal is asserted.

In another embodiment, a processing system on a chip includes a primary processing domain configured to run a first operating system; secondary processing domains configured to run other operating systems that are different than the first operating system. The primary processing domain includes a control circuit which includes a time stamp timer configured to increment a timestamp timer value based on a clock signal and provide the timestamp timer value to timer adjust circuits, each of the timer adjust circuits corresponding to one of the secondary processing domains, wherein the timer adjust circuits each include a subtraction circuit configured to subtract a previous timestamp timer value from the timestamp timer value to generate a secondary timestamp timer value for the corresponding secondary processing domain, wherein the previous timestamp timer value is the timestamp timer value when a rising edge of a power up signal from the corresponding secondary domain was detected. In one aspect, the timer adjust circuits are configured to update the secondary timestamp timer value for each of the secondary processing domains when the timestamp timer value increments. In another aspect, the timer adjust circuits are configured to update the secondary timestamp timer value for each of the secondary processing domains that are not in a power down or power save mode. In another aspect, at least one of the secondary processing domains includes a control circuit configured to issue a wake-up signal when the secondary timestamp timer value reaches a predetermined value. In another aspect, the timer adjust circuits further includes a binary to Gray code circuit to convert the secondary time stamp value to a Gray code format. In yet another aspect, the timer adjust circuits synchronize the secondary time stamp value upon detecting the rising edge of the power up signal. In another aspect, the first operating system is a real-time operating system and at least one of the other operating systems is an application operating system. In another aspect, when the primary processing domain is in a low power mode and the secondary processing domains are powered down, the timestamp timer value is incremented based on a second clock signal with a frequency that is lower than the first clock signal.

In yet another embodiment, a method of using one timestamp timer for multiple domains in a processing system includes running a first operating system in a processing core in a primary domain; running a second operating system in a processing core in a secondary domain, the second operating system is different than the first operating system; generating, in the primary domain, a first time stamp timer value for the primary domain; and generating a second time stamp timer value for the secondary domain by subtracting a previous first time stamp timer value from the first time stamp timer value when a power up signal is received in the primary domain from the secondary domain.

The invention claimed is:

1. An integrated circuit, comprising:
   a first processing domain configured to run a first operating system;
   a second processing domain configured to run a second operating system that is different than the first operating system; and
   a time stamp timer circuit in the first processing domain configured to provide a first time stamp value to the first processing domain and an adjusted second time stamp value to the second processing domain,
   wherein the time stamp timer circuit includes a timer adjust circuit configured to synchronize the adjusted second time stamp value when a power up signal is received by the time stamp timer circuit from the second processing domain.

2. The integrated circuit of claim 1, wherein the timer adjust circuit is configured to store the first time stamp value when the power up signal is received from the second processing domain, and subtract the stored first time stamp value from the first time stamp value to generate the adjusted second time stamp value that is provided to the second processing domain.

3. The integrated circuit of claim 1, wherein the power up indication is sent by the second processing domain when the second processing domain wakes up from a power saving mode.

4. The integrated circuit of claim 1, wherein the timer adjust circuit further includes a binary to Gray code circuit to convert the adjusted second time stamp value to a Gray code format.

5. The integrated circuit of claim 1, wherein the timer adjust circuit synchronizes the adjusted second time stamp value upon detecting a rising edge of the power up signal.

6. The integrated circuit of claim 1, further comprising:
   a control circuit in the second processing domain configured to schedule wake-up events by comparing the adjusted second time stamp value to a predetermined value that must be reached to signal a wake-up event.

7. The integrated circuit of claim 1, wherein the first and second processing domains are implemented in a system-on-a-chip.

8. The integrated circuit of claim 7, wherein the first operating system is a real-time operating system and the second operating system is an application operating system.

9. The integrated circuit of claim 2, wherein the first time stamp value is incremented based on a first clock signal and the adjusted second time stamp value is generated by subtracting the stored first time stamp value from the first time stamp value each time the first time stamp value is incremented.

10. The integrated circuit of claim 9, wherein when the first processing domain is in a low power mode and the second processing domain is powered down, the first time stamp value is incremented based on a second clock signal with a frequency that is lower than the first clock signal.

11. The integrated circuit of claim 1, wherein the first time stamp value is incremented by an offset value when a synced low power mode enable signal is asserted.

12. A processing system on a chip, comprising:
   a primary processing domain configured to run a first operating system;
   secondary processing domains configured to run other operating systems that are different than the first operating system;
   wherein the primary processing domain includes:
      a control circuit including:
         a time stamp timer configured to increment a timestamp timer value based on a clock signal and provide the timestamp timer value to timer adjust circuits, each of the timer adjust circuits corresponding to one of the secondary processing domains, wherein
         the timer adjust circuits each include a subtraction circuit configured to subtract a previous timestamp timer value from the timestamp timer value to generate a secondary timestamp timer value for the corresponding secondary processing domain, wherein the previous timestamp timer value is the timestamp timer value when a rising edge of a power up signal from the corresponding secondary domain was detected.

13. The processing system on a chip of claim 12, wherein:
   the timer adjust circuits are configured to update the secondary timestamp timer value for each of the secondary processing domains when the timestamp timer value increments.

14. The processing system on a chip of claim 12, wherein:
   the timer adjust circuits are configured to update the secondary timestamp timer value for each of the secondary processing domains that are not in a power down or power save mode.

15. The processing system on a chip of claim 12, wherein:
   at least one of the secondary processing domains includes a control circuit configured to issue a wake-up signal when the secondary timestamp timer value reaches a predetermined value.

16. The processing system on a chip of claim 12, wherein the timer adjust circuits further includes a binary to Gray code circuit to convert the secondary time stamp value to a Gray code format.

17. The processing system on a chip of claim 12, wherein the timer adjust circuits synchronize the secondary time stamp value upon detecting the rising edge of the power up signal.

18. The processing system on a chip of claim 12, wherein the first operating system is a real-time operating system and at least one of the other operating systems is an application operating system.

19. The processing system on a chip of claim 12, wherein when the primary processing domain is in a low power mode and the secondary processing domains are powered down, the timestamp timer value is incremented based on a second clock signal with a frequency that is lower than the first clock signal.

20. A method of using one timestamp timer for multiple domains in a processing system, comprising:
- running a first operating system in a processing core in a primary domain;
- running a second operating system in a processing core in a secondary domain, the second operating system is different than the first operating system;
- generating, in the primary domain, a first time stamp timer value for the primary domain;
- generating a second time stamp timer value for the secondary domain by subtracting a previous first time stamp timer value from the first time stamp timer value when a power up signal is received in the primary domain from the secondary domain.

* * * * *